(12) United States Patent
Fulton et al.

(10) Patent No.: US 6,845,989 B2
(45) Date of Patent: Jan. 25, 2005

(54) LIFT AXLE AIR PRESSURE TRANSFER CONTROL APPARATUS

(75) Inventors: R. Scott Fulton, Hudson, OH (US); Jeffrey D. Beaver, Akron, OH (US)

(73) Assignee: The Boler Company, Itasca, IL (US)

( * ) Notice: Subject to any disclaimer, the term of this patent is extended or adjusted under 35 U.S.C. 154(b) by 90 days.

(21) Appl. No.: 10/320,302

(22) Filed: Dec. 16, 2002

(65) Prior Publication Data

US 2003/0111810 A1 Jun. 19, 2003

Related U.S. Application Data

(60) Provisional application No. 60/342,320, filed on Dec. 19, 2001.

(51) Int. Cl.$^7$ .......................... B60G 11/27; B62D 61/12
(52) U.S. Cl. .............. 280/6.157; 280/86.5; 280/124.16; 180/24.02
(58) Field of Search .................... 280/86.5, 124.116, 280/124.128, 124.16, 124.157, 6.159, 6.157; 180/24.02, 209

(56) References Cited

U.S. PATENT DOCUMENTS 4,854,409 A * 8/1989 Hillebrand et al. ...... 180/24.02
5,018,755 A * 5/1991 McNeilus et al. ......... 280/86.5
6,398,236 B1 * 6/2002 Richardson ................ 280/86.5

FOREIGN PATENT DOCUMENTS

| EP | 0 950 602 A | 10/1999 | |
|---|---|---|---|
| FR | 2 083 456 A | 12/1971 | |
| WO | WO 9205970 A1 * | 4/1992 | ............ B60G/5/00 |

* cited by examiner

*Primary Examiner*—Peter C. English
(74) *Attorney, Agent, or Firm*—Buckingham, Doolittle & Burroughs, LLP; David P. Dureska

(57) ABSTRACT

A lift-type axle/suspension system of a heavy-duty vehicle includes ride air springs for providing vehicle load support when the system is lowered, and one or more lift air springs for selectively raising the system when such additional load support is unnecessary or when greater vehicle maneuverability is desired. An apparatus integrates and simultaneously controls the operating systems for the lift and ride air springs. The control apparatus includes a plurality of conduits and valves which enable pressurized air from the lift air springs to be rapidly provided to the ride air springs when the system is being lowered. The additional air supplements the normal source of air from the vehicle compressed air source to ensure sufficient and timely air for smooth and efficient operation of the ride air springs without excessive buckling or folding, thus maintaining adequate overall vehicle air pressure needed for operating other vehicle components.

10 Claims, 2 Drawing Sheets

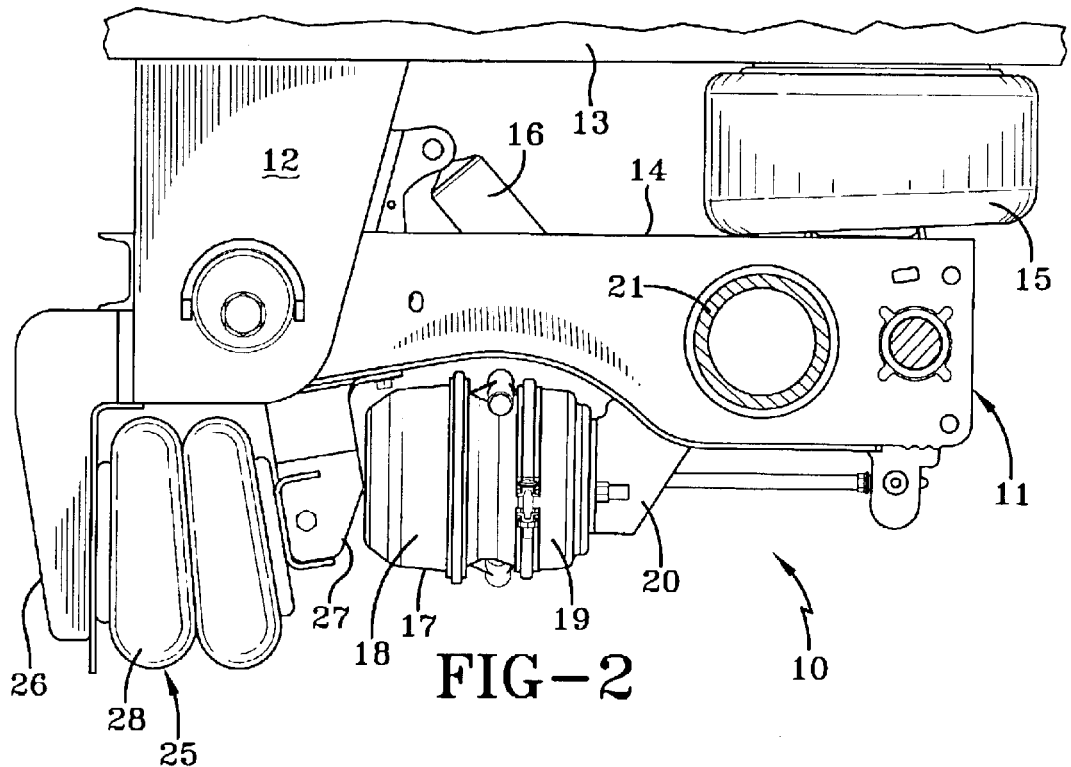
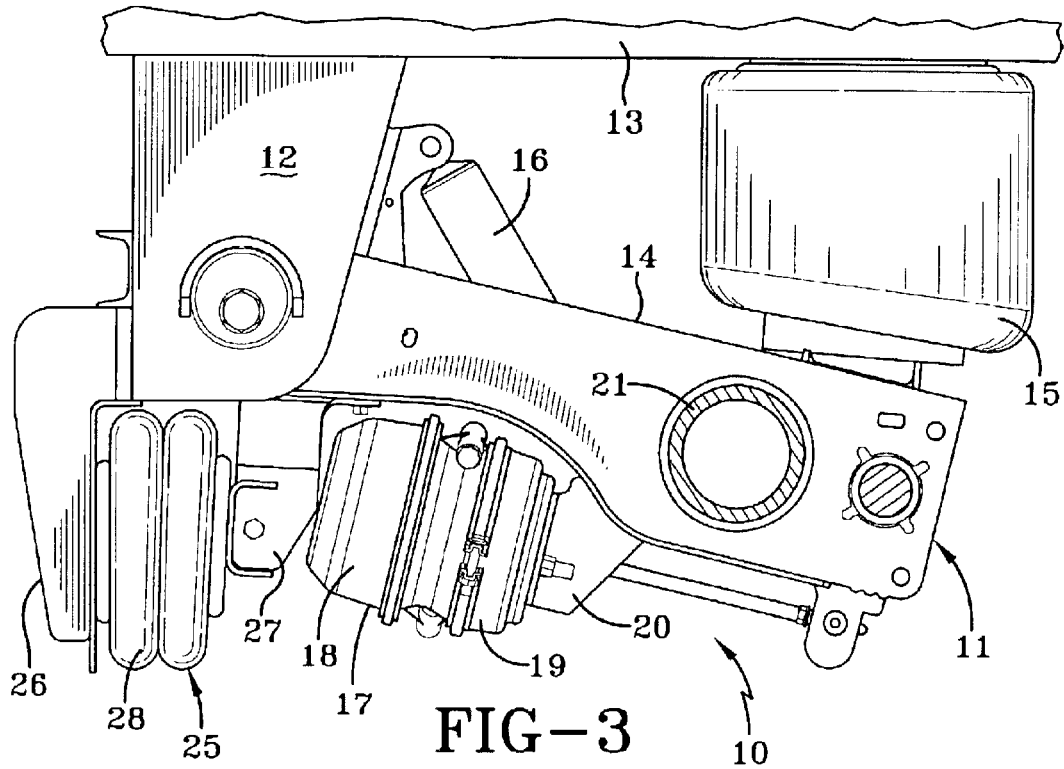

LIFT AXLE AIR PRESSURE TRANSFER CONTROL APPARATUS

CROSS-REFERENCE TO RELATED APPLICATION

This application claims benefit to U.S. Provisional Application No. 60/342,320, filed Dec. 19, 2001.

BACKGROUND OF THE INVENTION

1. Field of the Invention

The present invention relates to axle/suspension systems, and in particular to lift-type axle/suspension systems of heavy-duty commercial vehicles. More particularly, the invention relates to an apparatus that controls the transfer of air between one or more air springs which lift the axle and ride air springs of the axle/suspension system.

2. Background Art

Many commercial vehicles currently utilize suspension assemblies that can retract and thereby raise the axle of the axle/suspension system off the ground. Such suspension assemblies conventionally are known in the industry as lift axle suspensions. Lift axle/suspension systems usually are paired or grouped with non-lift axle/suspension systems on a vehicle, the latter of which are commonly referred to as primary axle/suspensions systems. The majority of lift axle/suspension systems utilize one or more pneumatic air springs to raise or retract the axle/suspension system. Pneumatic air springs of that type typically are referred to as lift air springs and generally can be placed in a variety of locations relative to the axle/suspension system to accomplish the lifting function. Another set, usually a pair, of pneumatic air springs is utilized to lower or extend the axle/suspension system for assisting in supporting the vehicle load, and typically are referred to as ride air springs.

Lift axle/suspension systems usually are retracted or raised when the vehicle load is less than the load capacity of the primary or non-lift axle/suspension systems, or when greater vehicle maneuverability is required. A number of different types of pneumatic or electro-pneumatic systems can be employed to operate lift axle/suspension systems, depending on the application and customer requirements. The present invention can be utilized with most types of such operating systems, and also generally can be used regardless of the location of the one or more lift air springs. Most such systems operate by simultaneously but independently supplying pressurized or compressed air to the lift air springs and exhausting air pressure from the ride air springs when it is desired to retract or raise the axle/suspension system. Conversely, when it is desired to lower the axle/suspension system to support a load, air pressure is supplied to the ride air springs and exhausted from the lift air springs.

Although such prior art operating systems accomplish their goal of raising and lowering the axle/suspension system, a number of drawbacks are inherent in those systems. More particularly, such prior art operating systems often suffer from low overall system air pressure and lack the ability to rapidly deliver pressurized air to the relatively large ride air springs. For example, every time the axle/suspension system is raised or lowered, air pressure from a set of air springs, either the ride air springs or the lift air springs, respectively, is exhausted to the atmosphere. This exhaustion or complete loss of a certain amount of compressed air significantly adds to the total air consumption of the vehicle and increases the demands on the vehicle compressor which supplies such pressurized air. If the lift axle/suspension systems, together with other air-consuming vehicle devices such as the brakes, are operated repeatedly over a short period of time, demand for pressurized air can exceed the compressor capacity, making it unlikely or impossible for all of the devices to operate at full capacity. More importantly, insufficient air pressure in those devices can cause premature failure of axle/suspension system components such as axles, beams, and even vehicle frame components, the primary cause of which is low air pressure in the axle/suspension system ride air springs.

Moreover, the ride air springs themselves can be damaged due to such low pressure. More particularly, in prior art air spring operating systems, as air pressure is exhausted from the lift air springs, those springs contract and gravity pulls the axle/suspension system in a downward direction. This downward movement of the axle/suspension system also extends the ride air springs. If the ride air spring operating system fails to simultaneously deliver pressurized air to the ride air springs fast enough when the axle/suspension system is lowering, the ride air springs can become extended before they are sufficiently filled with pressurized air. This lack of air pressure results in the ride air spring failing to be adequately distended, thereby causing its elastomeric flexible member to buckle or fold which can result in undesirable damage to the air spring.

The control apparatus of the present invention greatly reduces or eliminates the above-described problems by integrating control of the lift and ride air springs rather than allowing them to operate completely independent of one another. It is understood that the majority of lift axle/suspension systems typically use only a single lift air spring and a pair of ride air springs thereby requiring the use of only one control apparatus of the present invention. The illustrative system described below in detail in the description of the preferred embodiment has a pair of lift air springs and a pair of ride air springs. In such lift axle/suspension systems that utilize two lift air springs with the two ride air springs, one or two control apparatus can be utilized as desired without affecting the overall concept of the present invention.

More specifically, to prevent the above-described ride air spring buckling caused by low air pressure, the present invention utilizes an air pressure transfer line which extends between and preferably is pneumatically connected to a tee located in an exhaust port of the valve that controls operation of the lift air spring and the conduit that connects each of the ride air springs to their control valve. A one-way check valve located in the air pressure transfer line allows pressurized air to flow only in the direction from the lift air spring to the ride air springs. A choke valve installed in the exhaust port of the tee allows pressurized air to be fully exhausted from the lift air spring, but at a restricted rate.

As is well known in the suspension industry, pressurized air typically is supplied from the vehicle compressed air reservoir to the ride air springs via a height control valve and a dump valve, and to the lift air spring via a regulator and a valve. The present invention control apparatus as described immediately above supplies additional pressurized air from the lift air spring to the ride air springs when the axle/suspension system is being lowered, thus providing adequate air pressure to each ride air spring to rapidly inflate the flexible member during the lowering process, thus minimizing buckling and folding and potential damage to the ride air spring and other components of the vehicle. The present invention also minimizes the possibility that the vehicle compressor will lack capacity to supply air to all of the vehicle components requiring such air to operate.

Specifically, because of the additional or recycled pressurized air flowing into the ride air springs from the lift air spring, less overall pressurized air is required from the vehicle air compressor to inflate the ride air springs to the proper pressure, since not all of the air in the lift air spring is being exhausted to the atmosphere every time the axle/suspension system is lowered. Since more air is conserved, the possibility of low vehicle air pressure, and its potential negative impact on components of the lift axle/suspension system, is minimized or eliminated.

SUMMARY OF THE INVENTION

Objectives of the present invention include providing a control apparatus which enables adequate air pressure to be supplied to ride air springs in a timely manner during lowering of a lift axle/suspension system.

Another objective of the present invention is to provide a control apparatus which lowers overall vehicle requirements for pressurized air from the vehicle air compressor, thereby minimizing the possibility of low vehicle air pressure, and the undesirable result of devices which require such air operating at less than full capacity and possibly causing vehicle damage.

A further objective of the present invention is to provide such a control apparatus which is cost-effective, which easily can be installed as original equipment or retrofitted on existing lift axle/suspension systems, which is durable in use, and which is easy to maintain and replace.

These objectives and advantages are obtained by the improved lift axle air pressure transfer control apparatus of the present invention for use with a vehicle air-ride lift axle/suspension system, the system including at least one lift air spring for raising the axle/suspension system off the ground and at least one ride air spring for supporting a vehicle load when the axle/suspension system is lowered to the ground, the vehicle further including a source of compressed air and an operating system for each one of the lift air spring and the ride air spring, the general nature of the improvement including means for providing air from the deflating lift air spring to the inflating ride air spring when the axle/suspension system is being lowered, so that the ride air spring is sufficiently inflated during the lowering process.

BRIEF DESCRIPTION OF THE DRAWINGS

FIG. 2 is an elevational view of one of the suspension assemblies of one type of lift axle/suspension system which can utilize the control apparatus of the present invention, shown in the raised position;

FIG. 3 is a view similar to FIG. 2, but showing the suspension assembly in the lowered position.

Similar numerals refer to similar parts throughout the drawings.

DESCRIPTION OF THE PREFERRED EMBODIMENT

Figure 1:
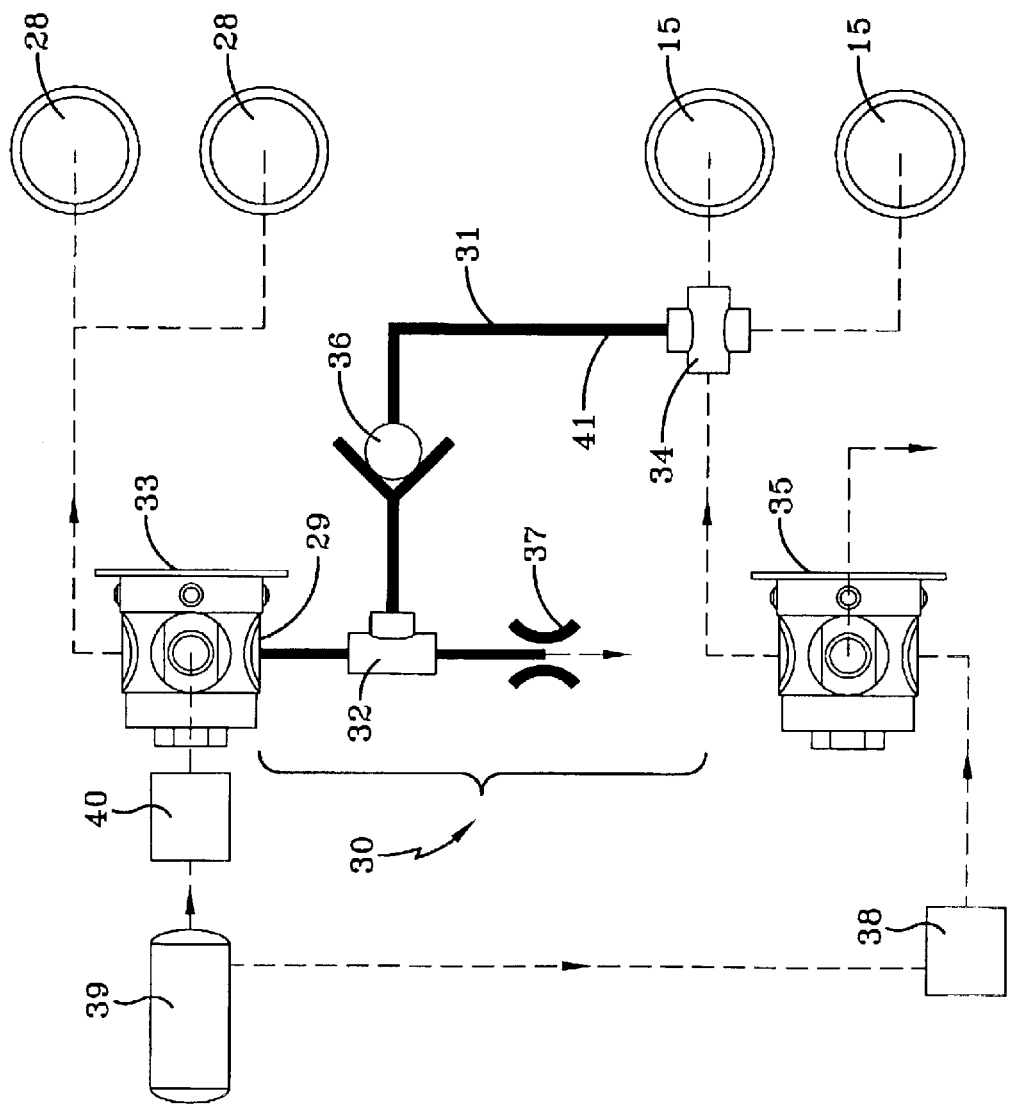
FIG. 1 is a diagrammatic view of the lift axle air pressure transfer control apparatus of the present invention.

So that the control apparatus of the present invention can be best understood, one representative environment in which the control apparatus can be used will first be described and is shown in FIGS. 2 and 3. More particularly, a suspension assembly of one type of lift axle/suspension system is shown in FIGS. 2 and 3 and described immediately below, with the only difference between the two figures being that FIG. 2 shows the suspension assembly in a raised or lifted position, and FIG. 3 shows it in an extended or lowered position.

Specifically, an air-ride trailing arm lift-type axle/suspension system for a semi-trailer is indicated generally at 10 and is shown in FIGS. 2 and 3. Inasmuch as lift axle/suspension system 10 includes a pair of transversely spaced generally identical suspension assemblies 11, only one suspension assembly is shown in the drawings and described herein. A hanger 12 is mounted on and extends downwardly from a frame 13 of a heavy-duty vehicle such as a semi-trailer. A suspension beam or arm 14 is pivotally attached at its front end via a bushing (not shown) in a manner well-known to the suspension art, thereby making it a trailing arm suspension assembly. It is understood that the present invention also can be utilized on leading arm, parallelogram, steerable, and other air-ride lift-type suspension assemblies without affecting the overall concept of the invention. A flexible elastomeric ride air spring 15 extends between and is attached to the upper surface of the rear end of beam 14 and the lowermost surface of frame 13. A shock absorber 16 extends between and is mounted on the inboard sidewall (not shown) of beam 14 and hanger 12. A dual brake chamber 17, including a parking brake chamber 18 and a service brake chamber 19, is mounted on a bottom surface of and beneath beam 14 via a bracket 20. Beam 14, together with its corresponding beam (not shown) of the transversely spaced suspension assembly 11 of axle/suspension system 10, immovably captures a transversely extending axle 21. Of course, a set of wheels/tires (not shown) is mounted on each end of axle 21 in a usual manner.

An axle lift assembly 25 is mounted on and beneath hanger 12 and beam 14. More particularly, a support member 26 is mounted on and extends downwardly from a front surface of hanger 12, and a bracket 27 is mounted on and extends downwardly from a bottom surface of beam 14. A flexible elastomeric bellows-type air chamber or bag or spring 28 generally is horizontally disposed and attached at its front end to support member 26 and at its rear end to bracket 27. The particular illustrative axle/suspension system 10 and lift assembly 25 described above and shown in the drawings, with which the present invention can be utilized, is more fully described and shown in U.S. Pat. No. 6,416,069 which is hereby fully incorporated herein by reference.

As best shown in FIG. 1, the control apparatus of the present invention is indicated generally at 30. In accordance with one of the important features of the present invention, one end of an air pressure transfer line 31 is pneumatically connected to a tee 32 located in an exhaust port 29 of a valve 33 that operates lift air springs 28. A second end of air pressure transfer line 31 in turn is pneumatically connected to a connector 34 that connects ride air springs 15 to a dump valve 35. A one-way check valve 36 is interposed in air pressure transfer line 31 and allows pressurized air to flow only in the direction from lift air springs 28 to ride air springs 15. A choke valve 37 is installed in the exhaust port of tee 32 and allows pressurized air to be exhausted to atmosphere from lift air springs 28, but at a restricted rate.

As is well known in the suspension industry, pressurized air typically is supplied to each ride air spring 15 from compressed air reservoir or tank 39 via a height control valve 38, and to lift air spring 28 from the tank via a regulator 40.

Lift axle air pressure transfer control apparatus 30 of the present invention described immediately above operates in the following manner. When valves 33, 35 that control lift and ride air springs 28, 15, respectively, on each suspension assembly 11 are operated to lower axle/suspension system 10, lift air spring valve 33 closes and pneumatically connects the lift air springs to valve exhaust port 29. Specifically, pressurized air previously supplied to lift air springs 28 from compressed air tank 39 then can flow from the lift air springs, through exhaust port 29 of valve 33, and into tee 32, while the valve simultaneously prevents air flow from the tank, through regulator 40 and into the lift air springs. A portion of the air flowing through tee 32 passes out of its exhaust port and into choke valve 37 where it is released to atmosphere at a restricted rate. At the same time, the other portion of pressurized air from lift air springs 28 not exhausted to atmosphere by choke valve 37 then flows into air pressure transfer line 31, through one-way check valve 36 and into ride air springs 15 via conduit 41 and connector 34. Simultaneously with the above-described additional pressurized rapid air flow, ride air spring dump valve 35 provides the normal source of pressurized air to ride air springs 15 from tank 39 via height control valve 38. Pressurized air stops flowing through air pressure transfer line 31 once the respective pressures in lift air springs 28 and ride air springs 15 equalize. Choke valve 37 ensures that each lift air spring 28 is fully exhausted. One-way check valve 36 prevents the pressurized air in ride air springs 15 from flowing back through air pressure transfer line 31 and into the atmosphere via tee 32 and choke valve 37.

Thus, it clearly can be appreciated that the supplemental compressed air source supplied to ride air springs 15 from lift air springs 28 by control apparatus 30 when axle/suspension system 10 is being lowered, rapidly provides adequate air pressure to each of the ride air springs to cause its elastomeric flexible member to be fully inflated during the lowering process, thus preventing buckling, folding and potential damage to the ride air spring and other components of the vehicle. Also, because of the additional or recycled pressurized air flowing into each ride air spring 15 from lift air springs 28, less overall pressurized air is required from the vehicle air compressor to inflate the ride air springs of both suspension assemblies 11 to the proper pressure, since not all of the air in lift air springs 28 is being exhausted to the atmosphere every time axle/suspension system 10 is lowered. Since more vehicle air is conserved, the possibility of low vehicle air pressure, and its potential negative impact on components of lift axle/suspension system 10 in particular, is reduced or eliminated.

It is understood that lift axle air pressure transfer control apparatus 30 of the present invention could have applications on many different types of lift axle/suspension systems of the air-ride type, including those that utilize only one lift air spring. The present invention also can be used on a wide range of vehicles, including tractors, trailers, straight trucks, or any type of vehicle which utilizes a lift axle/suspension system. The present invention also contemplates other parts and structures and their arrangement, including equivalents of the valves and conduits shown and described herein and equivalent arrangements thereof, for integrating and achieving the transfer of air pressure between one or more lift air springs of an axle/suspension system and its ride air springs.

Accordingly, the lift axle air pressure transfer control apparatus of the present invention is simplified, provides an effective, safe, inexpensive, and efficient apparatus which achieves all the enumerated objectives, provides for eliminating difficulties encountered with prior air spring operating systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the lift axle air pressure transfer control apparatus is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An air-ride lift axle and suspension system for a vehicle, said system including at least one lift air spring for raising said axle and suspension system off the ground and at least one ride air spring for supporting a vehicle load when the axle and suspension system is lowered to the ground, said vehicle further including a source of compressed air and an operating system for each one of said lift air spring and said ride air spring, said lift air spring deflating and said ride air spring inflating when said axle and suspension system is lowered to the ground, wherein the improvement comprises:

means for providing air from said deflating lift air spring to said inflating ride air spring so that the ride air spring is sufficiently inflated when said axle and suspension system is being lowered to the ground.

2. The air-ride lift axle and suspension system of claim 1, in which said means includes a first conduit pneumatically connected to and extending between said lift air spring operating system and said ride air spring operating system; in which a one-way check valve enabling air flow from said lift air spring to said ride air spring is interposed in said first conduit; and in which a choke valve enabling restricted flow of air from the lift air spring to atmosphere is pneumatically connected to the lift air spring operating system.

3. The air-ride lift axle and suspension system of claim 2, in which said lift air spring operating system includes a second conduit pneumatically connected to and extending between said lift air spring and said vehicle compressed air source; in which a control valve and a regulator each is interposed in said second conduit; and in which said second conduit control valve enables compressed air to flow from the compressed air source, through said second conduit regulator and the control valve, and into the lift air spring; in which said control valve includes an exhaust port; and in which said choke valve and said first conduit each is pneumatically connected to said control valve exhaust port.

4. The air-ride lift axle and suspension system of claim 3, in which said ride air spring operating system includes a third conduit pneumatically connected to and extending between said ride air spring and said vehicle compressed air source; in which a dump valve and a height control valve each is interposed in said third conduit; and in which said dump valve and said height control valve enable compressed air to flow from the compressed air source, through the height control valve and the dump valve, and into the ride air spring; and in which said first conduit is pneumatically connected to said third conduit.

5. The air-ride lift axle and suspension system of claim 4, in which said at least one ride air spring is a pair of ride air springs.

6. A method of conveying compressed air from a lift air spring to a ride air spring of an air-ride lift axle and suspension system of a vehicle, said system including at least one lift air spring for raising said axle and suspension system off the ground and at least one ride air spring for supporting a load of said vehicle when the axle and suspension system is lowered to the ground, the vehicle further including a source of compressed air and an operating system for each one of said lift air spring and said ride air spring, said method including the steps of:

a) closing a control valve interposed in a lift air spring conduit pneumatically connected to and extending between said vehicle compressed air source and said lift air spring;

b) simultaneously enabling air to flow from said lift air spring, through said control valve and out of an exhaust port of the control valve, wherein a portion of said air flowing out of said exhaust port passes at a restricted rate of flow through a choke valve pneumatically connected at one of its ends to said control valve exhaust port and at the other one of its ends to atmosphere, and wherein another portion of said exhausted air flows through a transfer conduit pneumatically connected at one of its ends to the exhaust port and at the other one of its ends to a ride air spring conduit pneumatically connected to and extending between said ride air spring and said vehicle compressed air source; and c) a one-way check valve interposed in said transfer conduit enabling said another portion of air to flow completely through said transfer conduit, into said ride air spring conduit and into said ride air spring so that the ride air spring is rapidly and sufficiently inflated when said axle and suspension system is being lowered to the ground.

7. The method of claim 6, in which said choke valve and said check valve enable complete exhaustion of air from said lift air spring.

8. The method of claim 6, in which said one-way check valve prevents air from flowing back into said lift air spring from said ride air spring.

9. The method of claim 6, in which compressed air automatically stops flowing through said transfer conduit when said compressed air in said lift air spring is generally equal to the compressed air in said ride air spring.

10. The method of claim 6, in which said at least one ride air spring is a pair of ride air springs; and in which compressed air is transferred from said lift air spring to said pair of ride air springs.

* * * * *